United States Patent

[11] 3,618,076

| [72] | Inventor | Earl W. Springer<br>Box 22, Fairland, Ind. 46126 |
|---|---|---|
| [21] | Appl. No. | 874,645 |
| [22] | Filed | Nov. 6, 1969 |
| [23] | | Division of Ser. No. 739,406,<br>June 24, 1968 |
| [45] | Patented | Nov. 2, 1971 |

[54] ALTITUDE REPORTER
13 Claims, 5 Drawing Figs.

[52] U.S. Cl. .................................................. 340/347 AD
[51] Int. Cl. .................................................... H03k 13/02
[50] Field of Search ........................................... 340/347

[56] References Cited
UNITED STATES PATENTS

| 2,656,106 | 10/1953 | Stabler | 340/347 |
|---|---|---|---|
| 2,948,890 | 8/1960 | Barth | 340/347 |
| 3,024,990 | 3/1962 | Magnuson | 340/347 |
| 3,099,831 | 7/1963 | Jones | 340/347 |
| 3,434,136 | 3/1969 | Hawleys | 340/347 |
| 3,349,325 | 10/1967 | Bayars | 340/347 |
| 3,248,727 | 4/1966 | Anastasia | 340/347 |
| 2,978,693 | 4/1961 | Champion | 340/347 |

*Primary Examiner*—Thomas A. Robinson
*Assistant Examiner*—Jeremiah Glassman
*Attorney*—Hood, Gust, Irish, Lundy & Coffey

ABSTRACT: An altitude reporter comprising an altimeter, electrooptical means for tracking the position of the indicator of the altimeter first means including a register for registering the position of the indicator and providing pulse group series output corresponding to such a position, and second means for operatively connecting the first means to the electrooptical tracking means. This second means is effective, when the indicator moves in one direction, to operate the register to add increments of such movement and, when the indicator moves in the opposite direction, to operate the register to subtract like increments of movement. The tracking means is arranged so that it will, in no way, interfere with the free movement of the indicator of the altimeter. The system of the present invention, therefore, comprises a standard aircraft altimeter and means for reading the altimeter, which reading means is arranged so that it will, in no way, disturb or change the characteristics of the altimeter.

ALTITUDE REPORTER

This is a divisional application based on my prior copending application Ser. No. 739,406 filed June 24, 1968.

It is an object of my invention to provide an altitude indicating and reporting system which is extremely reliable and simple in construction, but yet which is satisfactory for the purpose intended. My system is arranged to take readings directly from a conventional aircraft altimeter in which pilots have great confidence and to present these readings in a form in which they can be transmitted via a conventional transponder to a ground station.

Many years of research and development and testing have produced the standard aircraft altimeter which utilizes the forces developed by barometric pressure changes to drive indicators or pointers. Of course, these forces are very small and, consequently, the altimeter is a very delicate instrument. Heretofore, to my knowledge, no one has been able successfully to use the forces developed by the pressure sensing means of an altimeter to drive electrical pickoff devices such as variable resistors. The problem is that any such pickoff device will present such a load to the pressure sensing means that the output of the pressure sensing means will be erratic. It is for these reasons that my system is arranged to take readings from a standard altimeter without, in any way, placing a load on the pressure sensing means of the altimeter. In fact, in the preferred embodiments of my system, a standard altimeter, which is the only instrument technically and legally that can be used for air navigation, can be purchased and installed therein without, in any way, being modified. That is, my preferred system includes means for tracking the movement of the altimeter indicator through the glass cover plate of the altimeter.

My system may be used in conjunction with a transponder carried on an airplane and arranged to transmit the identity of the plane as well as other information, such as the altitude at which the plane is flying. With the advent of radar control of air traffic, a world wide system utilizing pulse communication from such transponders is being placed in service. The success of this world wide system will depend, for the most part, on the capability of most, if not all, of the flying aircraft to transmit via a transponder the necessary information, including altitude. My system is so simple in construction that it will be economically feasible for small aircraft owners to purchase and install the system in their aircraft. It will be understood, however, that my system can be provided in forms which are sufficiently sophisticated to be used in very large and expensive and complicated aircraft systems. My system, in one or more embodiments, is ideally suited for use with the air data computer systems presently being proposed for use with large commercial aircraft.

My altitude indicating and reporting system will provide an output which is in the form of a digital code suitable for automatic altitude transmission via the authorized air traffic control radar beacon system. This code is published in REPORT No. 8893-SP-1, for FEDERAL AVIATION AUTHORITY CONTRACT FAA/BRD-329, Task No. 6. Further, my code complies with International Civil Aviation Organization (ICAO) international agreements. One preferred embodiment of my system, therefore, comprises an encoder which is driven to produce this digital code output which is suitable for transmission via a transponder to a ground station. It will be understood, however, that my system is not limited to the use of such an encoder to produce the desired digital code. For instance, I may use a plurality of electronic circuits forming a register, which circuits are arranged to energize and deenergize switch means, each of which produces one bit of the code.

While I have described herein an altitude indicating and reporting system, it will be appreciated that the concepts embodied in my system may be used to read and report the output of any sensing means without, in any way, affecting the characteristics of the sensing means. Specifically, my system will track any movable indicator and provide a pulse output representing the position of the indicator. For instance, my system may be used in conjunction with any meter of the type having a movable pointer to read and report, by a series of pulses, the position of the pointer.

The above-mentioned ICAO agreements specify that the aircraft shall report its altitude in increments of 100 feet. It is necessary, therefore, to sense the position of the indicator of an altimeter at ten equally peripherally spaced positions about the face of the altimeter. That is, in a standard altimeter, movement of the indicator 36° represents a change in altitude of 100 feet.

One preferred embodiment of my system utilizes an encoder to provide the various pulse group series outputs representing 100-foot increments of altitude, the encoder including at least one disc having a plurality of concentrically arcuate contact strips formed thereon, a contact member arranged to engage each of the contact strips and means mounting the disc and the contact members for relative rotation. I prefer to use a pair of rotary stepping motors for producing such relative rotation, one motor being arranged to produce a predetermined amount of relative rotation in one direction for each 100-foot increase in altitude and the other motor being arranged to produce a like amount of relative rotation in the opposite direction for each 100-foot decrease in altitude. Thus, my encoder is driven in steps representing 100-foot increments in altitude. Since my encoder is driven in finite steps by such stepping motors, there will be no tendency for it to drift between the levels of altitude at which it is desired that an altitude report be made. That is, my encoder will produce a particular pulse group series steadily until it is stepped in one direction or the other to produce a different pulse group series. I prefer to use rotary stepping motors which produce relatively high output torques so that I can urge each contact member of the encoder against its associated contact strip with greater force which will, in effect, be a load which must be overcome by the stepping motors. However, this greater force of engagement between each contact member and contact strip provides a more reliable contact therebetween.

SUMMARY OF THE INVENTION

My invention is, therefore, an apparatus comprising sensing means including a movable indicator, means for tracking the position of the indicator, the tracking means including electro-optical means for detecting movement of the indicator, first means including a register for registering the position of the indicator and providing an output corresponding to such a position, and second means for operatively connecting the first means to the electro-optical means. This second means is effective, when the indicator moves in one direction along its path of movement, to operate the register to add increments of such movement and, when the indicator moves in the opposite direction along its path, to operate the register to subtract like increments of movement.

It is an object of my invention to provide such an apparatus in which the electro-optical means includes a plurality of light-responsive devices spaced along the path of movement of the indicator, a light source associated with said devices, each of said devices being effective, when the indicator moves adjacent thereto and produces a change in the amount of light impinging thereon, electrically to change state to indicate such movement of the indicator.

Another object of my invention is to provide such an apparatus in which the devices are spaced in pairs along the path of movement, one device of each pair providing an output effective, when applied by the second means to the first means, to operate the register to add an increment of movement and the other device of each pair providing an output effective, when applied by the second means to the first means, to operate the register to subtract such an increment of movement.

Still another object of my invention is to provide such an apparatus in which the second means includes an adding means and a subtracting means operatively connected to the register, whereby, when the indicator is approximately centered relative to the said one and the said other device of a pair, the adding means and subtracting means are simultaneously operated, each to cancel the effect of the other, and, when the indicator moves away from such a centered position, the register is operated to register the direction of movement of the indicator.

A further object of my invention is to provide such an apparatus in which the register comprises an encoder and shaft means drivingly connected to the encoder, the adding means including first means for driving the encoder shaft means in one direction and the subtracting means including second means for driving the encoder shaft means in the opposite direction. As stated previously, I prefer that these driving means be rotary stepping motors which are capable of moving the shaft means in finite steps.

Still a further object of my invention is to provide such an apparatus in which the second means includes a rotary switch means of the open-circuit-seeking type providing a directional sense for the system which drives the encoder.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
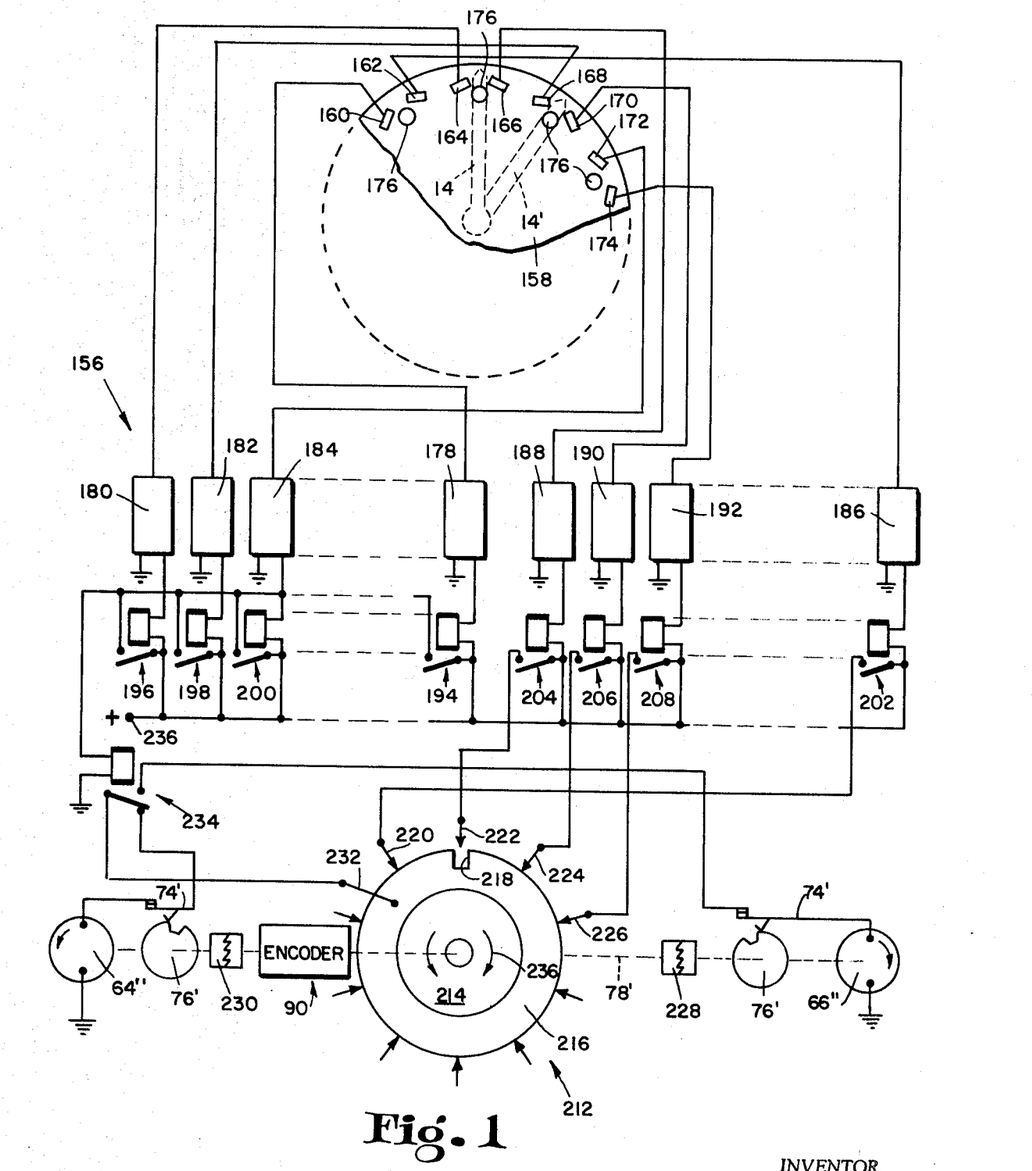
FIG. 1 is a block diagram of an embodiment of my invention, which embodiment utilizes a plurality of pairs of light-responsive devices peripherally spaced about the face of an altimeter to be adjacent the path of movement of the indicator of the altimeter.

Referring now to FIG. 1, an embodiment of my invention, indicated generally by the reference numeral 156, will be discussed. This embodiment 156 comprises a stationary support plate 158 which is disposed adjacent the path of movement of the indicator 14 of an altimeter. A plurality of pairs of light-responsive devices is peripherally spaced about the path of movement of the indicator 14, the peripheral spacing between the pairs preferably being the equivalent of a 100-foot increment of altitude. In FIG. 1, only four pairs of devices are illustrated, these pairs being indicated by the reference numerals 160 and 162, 164 and 166, 168 and 170, and 172 and 174. Any number of types of light-responsive devices will electrically change state when the amount of light impinging thereon is changed. Thus, I am not limited to any particular light-responsive device. For instance, there are commercially available light-actuated silicon controlled rectifiers which will permit or prevent current flow depending on the amount of light impinging thereon. Such rectifiers are described, for instance, in the SILICON CONTROLLED RECTIFIER MANUAL, Third Edition, published by the General Electric Company in 1964. Similarly, there are commercially available light-actuated transistors and diodes which will permit current flow or prevent current flow depending on the amount of light impinging thereon. I prefer to use a simple photovoltaic cell for generating an electrical potential upon the incidence of light thereon. Such cells, which are normally fabricated from a material such as selenium or silicon, are particularly suited for my system because of their reliability and extremely small size. Presently, I prefer to use such cells which are approximately 0.125 inch by 0.250 inch and 0.050 inch thick, including conductor wire. These cells are fabricated from silicon and will produce approximately 18 microamperes across a microammeter having a measured DC resistance of 8,000 ohms when the indicator 14 reflects light back thereon.

A light source 176 is mounted on the support plate 158 in between the light-responsive devices of each pair and arranged to project light toward the path of movement of the indicator 14. Each of the devices 160, 164, 168, 172, i.e., the counterclockwise device of each pair, is connected to an amplifier 178, 180, 182, 184. Similarly, each of the devices 162, 166, 170, 174, i.e., the clockwise device of each pair, is connected to an amplifier 186, 188, 190, 192. The system of FIG. 1, of course, comprises 20 such amplifiers 178–192, i.e., two amplifiers for each pair of light-responsive devices. In order to simplify the showing of FIG. 1, I have not shown six pairs of light-responsive devices and 12 amplifiers.

Each amplifier 178, 180, 182, 184 is arranged to energize a relay 194, 196, 198, 200 when light is reflected on the device 160, 164, 168, 172 connected thereto. Similarly, each of the amplifiers 186, 188, 190, 192 is arranged to energize a relay 202, 204, 206, 208 when the device 162, 166, 170, 174 connected thereto is energized by light reflected thereon. Each of these relays 194–208 constitutes a two-state switch means which, in one of its states, opens a circuit and, in the other of its states, closes a circuit. It will be recognized that such relays are the equivalent of, for instance, a silicon controlled switch which will permit current flow through its anode-cathode circuit when a proper potential is applied to its gate-control electrode.

This system 156 comprises an encoder 90 and a pair of oppositely directed rotary stepping motors 64″, 66″ arranged to drive the encoder to register the position of the indicator 14. In FIG. 1, I show the motors 64″, 66″ arranged to drive a common shaft means 78′ and the encoder 90 connected directly to the shaft means 78′. A cam-operated switch 74′ is arranged to deenergize each motor 64″, 66″ after it has been energized to drive the encoder 90, the switch 74′ being operated by a cam 76′ driven by the motor.

In order to provide a directional sense to the drive system for the encoder 90 of the system 156, I have provided a rotary switch means 212 drivingly connected to the motors 64″, 66″. In FIG. 1, the rotary switch means 212 comprises a rotor 214 mounted on the shaft means 78′ and providing a peripherally extending contact strip 216 having a gap 218 formed therein. A stator contact member 220, 222, 224, 226 is connected to each relay 202, 204, 206, 208, the stator contact members being equally peripherally spaced about the contact strip 216 so that one of the contact members overlies the gap 218. Of course, there are ten such stator contact members. Clutch means 228, 230 are disposed on opposite sides of the rotary switch means 212 so that its rotor 214 can be driven in either direction by the motors 64″, 66″. A common contact member is arranged continually to engage the contact strip 216 so that it is always in electrical contact with nine out of the ten stator contact members 220–226. A relay 234 is arranged alternatively to connect the motors 64″, 66″ to the common contact member 232, the relay being arranged so that, when it is deenergized, the motor 64″ is connected to the contact member 232 and, when it is energized, the motor 66″ is connected to the contact member 232. The relay 234 will be energized when any one of the relays 194–200 is energized by the amplifier 178–184 connected thereto. Specifically, each of the relays 194–200 is arranged so that when it is energized it will permit current flow from the power terminal 236 through the coil of the relay 234. Each of the relays 202–208 is arranged so that, when it is energized, it will connect its associated stator contact member 220–226 to the power terminal 236. The rotary switch 212 is of the open-circuit-seeking type in that it will energize one of the motors 64", 66" to drive the rotor 214 until there is an open-circuit condition between the relay 202–208 which is energized and the contact strip 216. That is, since both of the motors 64"', 66" must be energized through one of the relays 202–208 and the contact strip 216, one of the motors will be energized until there is an open-circuit condition established between the one relay 202–208 which is energized and the contact strip 216.

When the indicator 14 is substantially centered between the light-responsive devices 160 and 162, 164 and 166, 168 and 170, 172 and 174, comprising each pair of devices, the pair will be energized and the two amplifiers 178–192 connected, respectively, thereto will be energized. For instance, when the indicator 14 is in its illustrated vertically extending position centered between the devices 164, 166, both of the devices and the amplifiers 178, 188 connected thereto will be energized. Note, however, that the relay 204 controlled by the amplifier 188 is not in contact with the contact strip 216 because the contact member 222 is in registry with the gap 218. Thus, with the rotary switch means 212 and the indicator 14 in the positions illustrated, both motors 64"', 66" are deenergized. If the indicator 14 moves clockwise as viewed in FIG. 1 to the position indicated at 14', since there is an open-circuit condition between the contact member 222 and the contact strip 216, neither motor 64"', 66" will be energized until the indicator reaches the position 14' and the two devices 168, 170 at that position are both energized. When the devices 168, 170 are so energized, the amplifiers 182, 190 are energized and since there is contact between the stator contact member 224 connected to the relay 206 which is energized by the amplifier 190 and since the relay 234 is energized by the amplifier 182 to connect the motor 66" to the contact member 232, the motor 66" will drive the rotary switch means 212 and the encoder 90 in the direction of the arrow 236 until the gap 218 is in registry with the stator contact member 224. Once there is established an open-circuit condition between the contact member 224 and the contact strip 216, the indicator can move approximately 36° in either direction from its position illustrated at 14' without energizing either motor 64", 66". Once the indicator moves a full 36° in either direction from its position 14', one of the motors 64", 66" will be energized again to drive the rotary switch means 212 and encoder 90 to a new position which corresponds to the new position of the indicator.

Since the motor 66" drives the rotary switch means 212 and encoder 90 when the indicator 14 moves clockwise, and since clockwise movement of the indicator indicates an increase in altitude, the motor 66" is considered and adding means or a means for operating the encoder 90 to add increments of altitude. Similarly, the motor 64", which will drive the rotary switch means 212 and encoder 90 when the indicator moves counterclockwise, can be considered as a subtracting means or a means for operating the encoder to subtract increments of altitude.

I believe that an important feature of the system 156 (FIG. 1) is the direction sensing capability provided by the rotary switch means 212 and the use of pairs of light-responsive devices peripherally spaced about the path of movement of the indicator. The rotary switch means 212, therefore, functions as a memory device, i.e., a device for remembering the position from which the indicator 14 has moved.

My system 156 can utilize an altimeter in its "off-the-shelf" condition. It will also be appreciated that the system 156 is not particularly sophisticated. Although the system 156 does comprise twenty separate amplifiers, it will be appreciated that these amplifiers must only be sufficiently sophisticated to sense an output of a light-responsive device and to provide an output which is sufficient to energize a relay.

It will further be appreciated that each amplifier 178–192 and its associated relay 194–208 can, if desired, be replaced by a light-actuated silicon-controlled switch. In such a case, the switches may be mounted directly on the support plage 158.

Figure 2:
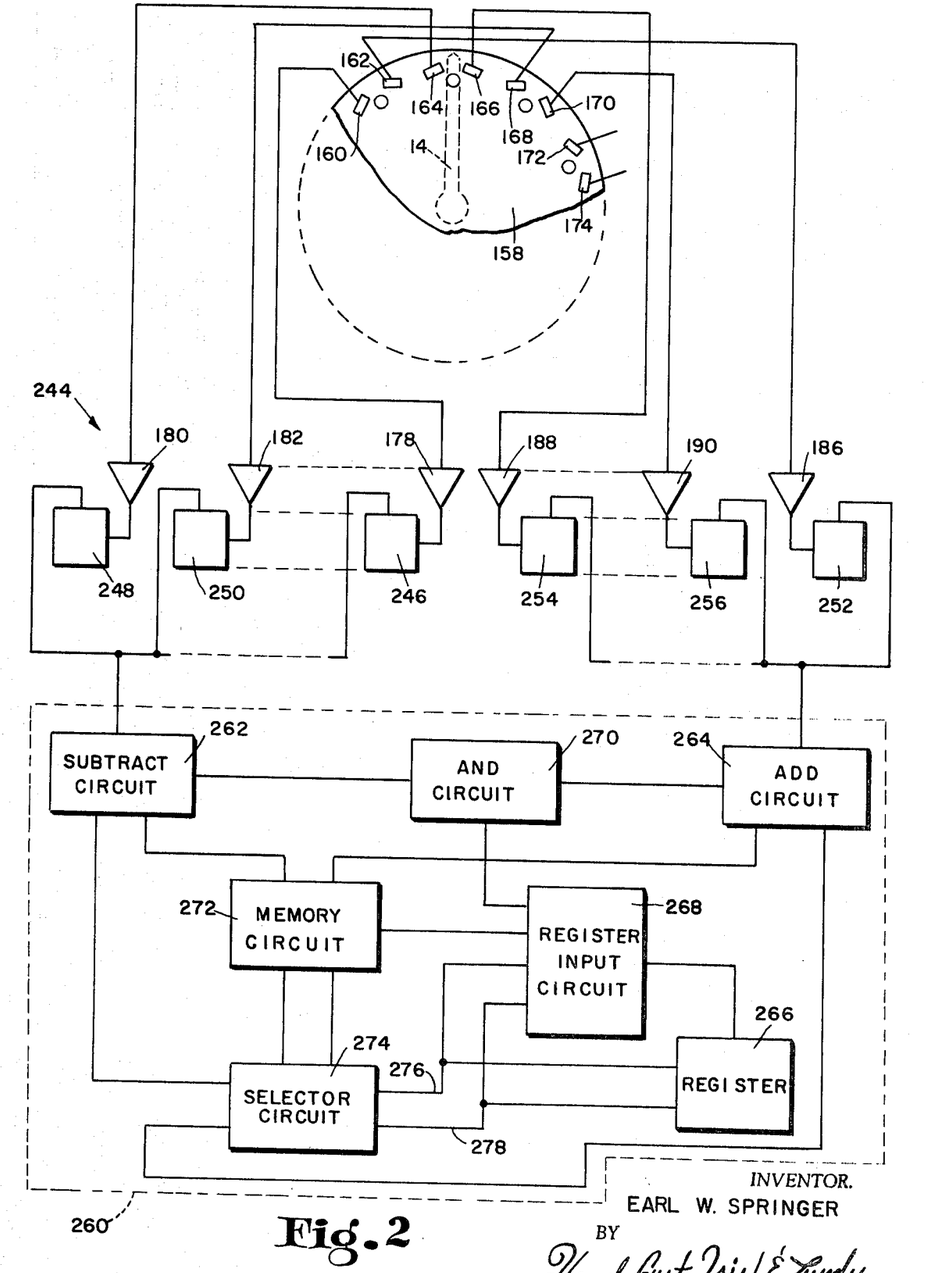
FIG. 2 is a block diagram of another embodiment of my invention, which embodiment constitutes an electronic analogy of the embodiment of FIG. 1.

Referring now to FIG. 2, another embodiment of my invention, indicated generally by the reference numeral 244, will be discussed. This embodiment 244 is an electronic analogy of the electromechanical system 156 (FIG. 1). The embodiment or system 244 comprises 10 pairs of light-responsive devices equally peripherally spaced about the path of movement of the indicator 14, the output of each device being connected to an amplifier. As a matter of convenience, I have only illustrated four of the 10 required pairs of light-responsive devices and six of the 20 required amplifiers in FIG. 2. The reference numerals applied to the illustrated devices correspond to the reference numerals applied in FIG. 1. Each amplifier 178, 180, 182, 186, 188, 190, is arranged to energize a switch means 246, 248, 250, 252, 254, 256 when the light-responsive device connected thereto is energized by the light reflected thereon. These switch means 246–256 may be any number of types of two-state switching devices, such as transistors, silicon-controlled switches, etc., i.e., a device which will, in one state, block current flow or a particular level of current flow, and, in the other of its states, permit current flow.

I have drawn a dashline box 260 about a portion of the circuitry of the embodiment of FIG. 2. The circuitry in this box 260 will perform electronically the function of the motors 64", 66", rotary switch means 212, relay 234 and encoder 90 comprising the system 156 of FIG. 1. Specifically, the output of the counterclockwise device of each pair of light-responsive devices is amplified to operate a switch means 246, 248, 250 which, in turn, applies a pulse of current to a subtract circuit 262 and the output of the clockwise device of each pair is amplified to operate a switch means 252, 254, 256 which, in turn, applies a pulse to an add circuit 264, the circuits 262, 264 comprising the circuitry in the box 260. Also inside the box 260 is a register 266, a register input circuit 268, and AND-circuit 270, a memory circuit 272 and a selector circuit 274. Each of these circuits 262–274, which are shown in block diagram form in FIG. 2, is quite common to the computer arts and engineers familiar with that art will recognize that they are quite common. For instance, the TRANSISTOR MANUAL published in 1964 by the General Electric Company discloses circuitry which, when properly interconnected, will provide the desired results. The register 266, for instance, may comprise a bank of bistable multivibrators, commonly called flip-flop circuits, each of which is arranged to energize or deenergize a relay, depending on the state to which it has been switched by a pulse input. Each of such relays can provide one bit of the pulse group series required for transmitting altitude indications to a ground station.

The register input circuit 268 is arranged to feed an input to the register 266 upon the receipt of a proper input from the AND-circuit 270 and the memory circuit 272 as well as a proper input from one of the two outputs 276, 278 of the selector circuit 274. Thus, the circuit 268 may comprise another AND circuit which will provide an output only upon the receipt of an input from each of the circuits 270 and 272 and an OR circuit which will provide an output upon the receipt of a pulse from either the output 276 or the output 278. As will be discussed hereinafter, whether the register 266 is operated to add an increment of altitude or to subtract an increment of altitude will depend on which of the two outputs 276, 278 of the selector circuit 274 is applied to the register input circuit 268. Thus, the register 266 must include circuit means for detecting which of the two outputs 276, 278 is present at the time of receipt of an input from the circuit 268. In other words, if one of the outputs 276, 278 is present, the register must be operated to add an increment of altitude and, if the other output is present, the register must be operated to subtract an increment of altitude.

The AND circuit 270 will not provide an input to the register input circuit 268 until it receives an input from the subtract circuit 262 and an input from the add circuit 264. Since the system of FIG. 2 is analogous to the system of FIG. 1, the only time that there will be an output from both circuits 262, 264 is when the indicator 14 is substantially centered between one of the pairs of light-responsive devices. Thus, the register 266 will not add or subtract increments of altitude until the indicator moves through an arc of 36°.

The selector circuit 274 is arranged so that, after it receives an output from both the subtract circuit 262 and add circuit 264 indicating that the indicator 14 is centered between a pair of light-responsive devices, it will provide an output corresponding to the last of its inputs to disappear. Thus, the selector circuit 274 will provide an output which will cause the register 266 to add an increment of altitude if the indicator 14 moves clockwise or an output which will cause the register 266 to subtract an increment of altitude if the indicator moves counterclockwise.

The memory circuit 272 performs the same function as the rotary switch 212 discussed in conjunction with FIG. 1. That is, the memory circuit establishes the position of the indicator 14 and prevents the register from being operated to add or subtract increments of altitude when the indicator oscillates past light-responsive devices without moving a full 36°. The memory circuit 272 receives inputs from the selector circuit 274 so that it can remember whether the register 266 has just been operated to add or to subtract and it receives inputs from the subtract circuit 262 and add circuit 264. The memory circuit 272 is arranged so that, after the register 266 has been operated to add an increment of altitude, it will not provide an input to the circuit 268 until it receives an input from the subtract circuit 262 and, conversely, so that, after the register 266 has been operated to subtract an increment of altitude, it will not provide an input to the circuit 268 until it receives an input from the add circuit 264.

Since a 10-stage ring counter is the electronic equivalent of a 10-stage rotary switch, the memory circuit 272 may be such a ring counter. Ring counters are also well-known circuits to those familiar with the computer arts.

It will be appreciated that, with the exception of the output relays of the register 266, the system 244 illustrated in FIG. 2 has no moving parts. In fact, the output relays of the register 266 can be replaced by silicon-controlled switches which are alternatively conductive or nonconductive, depending on the state of the bistable multivibrator to which each switch is connected.

It will be appreciated that the system of FIGS. 1 and 2 can be used with an altimeter without, in any way, modifying the altimeter. In both systems 156, 244, the light is projected through the cover plate of the altimeter toward the path of movement of the indicator 14. The indicator reflects the light back through the cover plate toward the light-responsive devices.

Figure 3:
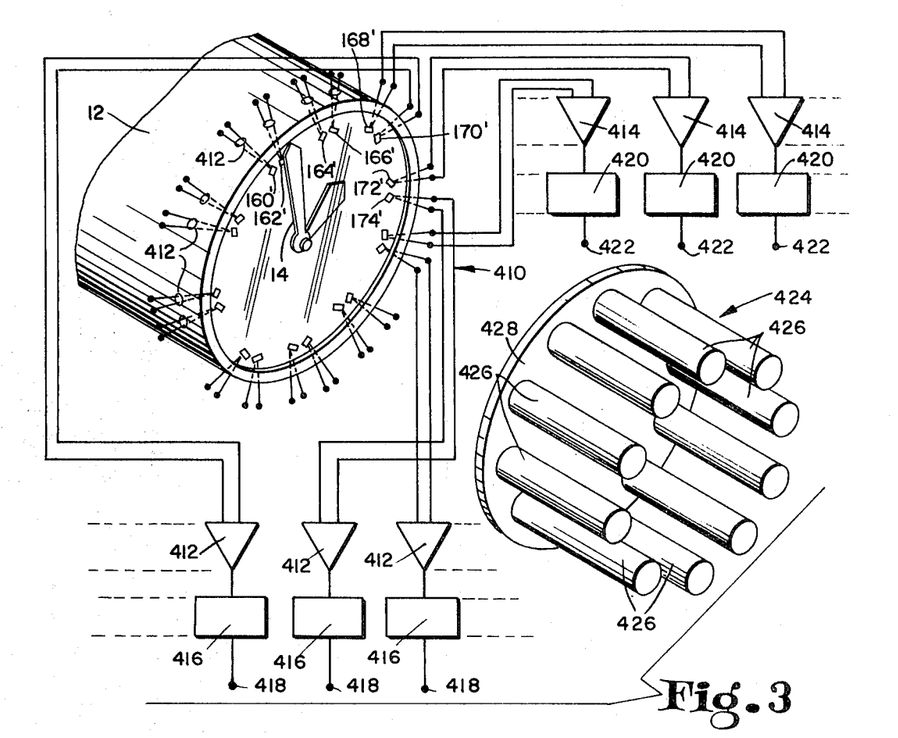
FIG. 3 is a fragmentary, exploded perspective view of yet another embodiment of my invention, this embodiment comprising a plurality of pairs of light-responsive devices peripherally spaced about the path of movement of the indicator of the altimeter and a light source associated with each pair of devices, the indicator being arranged to move between each light source and its associated pair of devices.

Referring now to FIG. 3, another embodiment of my invention, indicated generally by the reference numeral 410, will be discussed. This embodiment 410 does require some modification of an altimeter 12 in that it is necessary to remove the cover plate thereof and to install the light-responsive devices on the face of the altimeter to be behind the indicator 14. Also, it is necessary to provide some holes 412 in the housing of the altimeter so that connections can be made to the light-responsive devices. It will be appreciated that such modifications may be made by the manufacturer of the altimeter 12 and that these modifications will, in no way, interfere with the normal operation of the altimeter. After the light-responsive devices are installed on the face of the altimeter and connection is made thereto, the usual cover plate can be installed.

The light-responsive devices utilized in the system 410 may be identical to those discussed previously. Thus, I have applied reference numerals to some of these devices to show that the devices correspond to the like-numbered devices in FIGS. 1 and 2.

An amplifier 412 is connected to the clockwise device of each pair and a similar amplifier 414 is connected to the counterclockwise device of each pair, only three amplifiers 412 and only three amplifiers 414 being shown in FIG. 3. Each amplifier 412 is arranged to energize a switch means 416 having an output terminal 418, the switch means 416 corresponding to the switch means 252–256 in FIG. 2. Similarly, a switch means 420, which corresponds to the switch means 246–250 in FIG. 2, is connected to the output of each amplifier 414, each switch means 420 having an output terminal 422.

The system 410 comprises a light source means, indicated generally by the reference numeral 424, including a plurality of peripherally spaced apart light sources 426, each of which is arranged to direct light at one pair of light-responsive devices. The light sources 426 are carried by a plate 428 which is mounted adjacent the path of movement of the indicator 14.

Each of the light-responsive devices comprising the system 410 may be arranged to provide continually a potential to the amplifier 412, 414 connected thereto until the indicator 14 blocks the light projected at the device. In such a case, each switch means 416, 420 is arranged to provide a pulse output when the amplifier 412, 414 connected thereto is deenergized.

The indicator 14 is preferably arranged so that, when it is substantially centered between the two devices comprising each pair, it will block the light projected at both devices. Thus, the manner in which the indicator 14 energizes and deenergizes the light-responsive devices comprising the system 410 is analogous to that discussed in conjunction with FIGS. 1 and 2.

Figure 4:
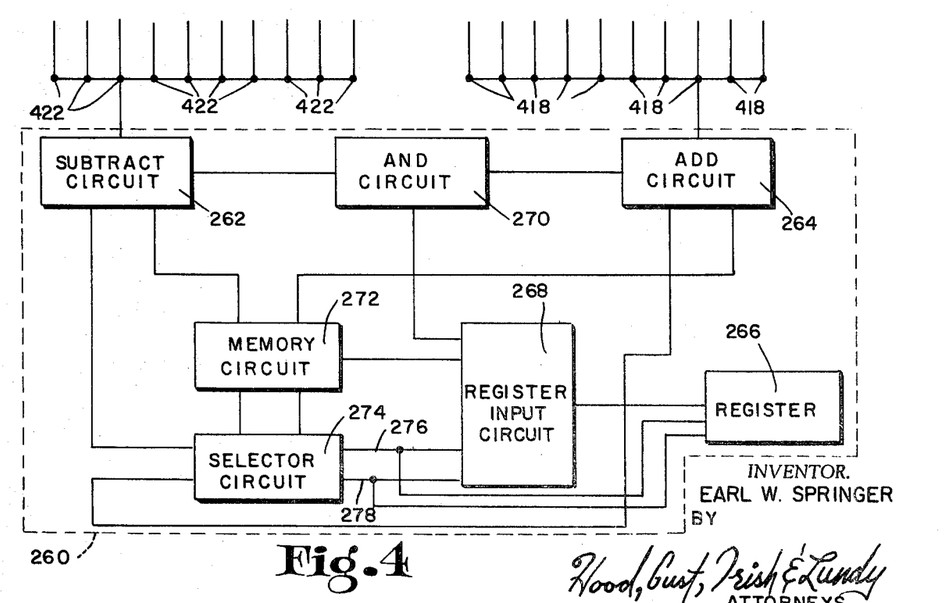
FIG. 4 is a block diagram view of an electronic system for registering, i.e., adding and subtracting, the outputs of the light-responsive devices of FIG. 3.

Referring now to FIG. 4, a system for registering the outputs applied to the terminals 418, 422 will be discussed. This system comprises the circuitry 260 of FIG. 2. Thus, each of the terminals 418 is arranged to provide pulses to the add circuit 264 and each of the terminals 422 is arranged to provide pulses to the subtract circuit 262.

Figure 5:
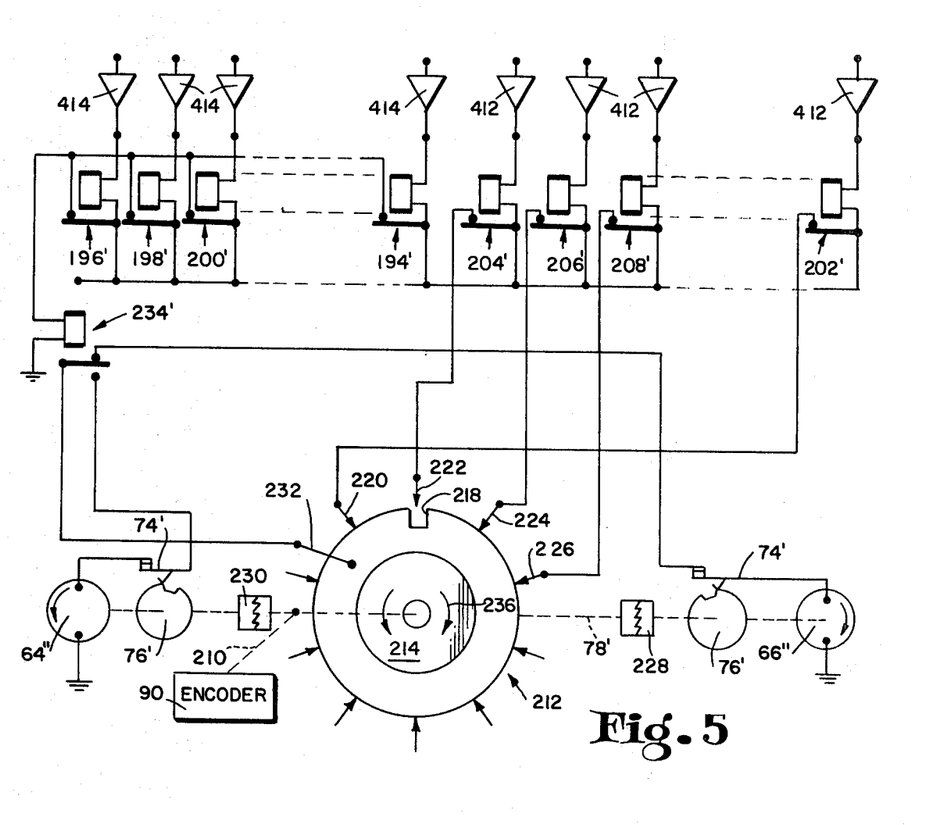
FIG. 5 is a block diagram of an encoder system for registering the outputs of the light-responsive devices of FIG. 3.

Referring now to FIG. 5, an encoder means for registering the position of the indicator 14 of the system 410 will be discussed. This system (FIG. 5) is directly analogous to the system shown in FIG. 1 and, therefore, only the distinguishing features of the two systems will now be discussed. In FIG. 5, the encoder 90 is shown drivingly connected to the shaft 78' by means indicated by the reference numeral 210.

A normally closed relay 194', 196', 198', 200' is operatively connected to each amplifier 414 and a normally closed relay 202', 204', 206', 208' is operatively connected to each amplifier 412, these relays correspondingly directly to the like numbered relays in FIG. 1. Each of these relays 194'–208' is held open when the amplifier 412, 414 connected thereto is energized. The relay 234', which is operated by the relays 194', 196', 198', 200' is arranged normally to connect the rotary stepping motor stepping motor 66" to the common contact member 232.

What is claimed is:

1. An altitude-reporting apparatus of the character described comprising altitude-sensing means including a peripherally narrow, radially extending indicator movable pivotally about an axis, means for tracking the position of said indicator, said tracking means including electro-optical means for detecting movement of said indicator, said electro-optical means including a plurality of light-responsive devices spaced along the path of movement of said indicator, a light source associated with said devices, each of said devices being effective, when said indicator moves past said device and produces a change in the amount of light impinging thereon, electrically to change state to indicate such movement of said indicator, first means including a register for registering the position of said indicator and providing an electrical pulse output representing a binary-coded pulse group series corresponding to the position of said indicator, and second means for operatively connecting said first means to said electro-optical means, said second means being effective, when said indicator moves in one direction along its path of movement, to operate said register to add increments of such movement and, when said indicator moves in the opposite direction along its path, to operate said register to subtract like increments of movement, said devices being spaced in a plurality of equally peripherally spaced pairs along said path of movement, one device of each pair providing an output effective, when applied by said second means to said first means, to operate said register to add an increment of movement and the other device of each pair providing an output effective, when applied by said second means to said first means, to operate said register to subtract such an increment of movement.

2. The apparatus of claim 1 in which said light source includes a light associated with each of said pairs of devices, each of said lights being arranged to direct light on its associated pair of devices and said indicator being arranged to move between each of said lights and its associated pair of devices, said indicator being proportioned and designed, when it is approximately centered relative to the devices of each of said pairs, simultaneously to block the light directed at said devices.

3. The apparatus of claim 1 in which said light source includes a light associated with each of said pairs of devices, each of said lights being arranged to direct light away from its associated pair of devices, and said indicator being proportioned and designed, when it is approximately centered relative to the devices of each of said pairs, simultaneously to reflect the light back toward said devices.

4. The apparatus of claim 3 in which said second means includes an adding means and a subtracting means operatively connected to said register, each of said one devices being operatively connected to said adding means and each of said other devices being operatively connected to said subtracting means, whereby, when said indicator is approximately centered relative to said one and said other devices of a pair, said adding means and said subtracting means are simultaneously operated, each to cancel the effect of the other, and, when said indicator moves a way from such a centered position, said register is operated to register the direction of movement of said indicator.

5. The apparatus of claim 2 in which said second means includes an adding means and a subtracting means operatively connected to said register, each of said one devices being operatively connected to said adding means and each of said other devices being operatively connected to said subtracting means, whereby, when said indicator is approximately centered relative to said one and said other devices of a pair, said adding means and said subtracting means are simultaneously operated, each to cancel the effect of the other, and, when said indicator moves away from such a centered position, said register is operated to register the direction of movement of said indicator.

6. An altitude-reporting apparatus of the character described comprising sensing means including a peripherally narrow, radially extending movable indicator, means for tracking the position of said indicator, said tracking means including electro-optical means for detecting movement of said indicator, said electro-optical means including a plurality of light-responsive devices spaced along the path of movement of said indicator, a light source associated with said devices, each of said devices being effective, when said indicator moves past said device and produces a change in the amount of light impinging thereon, electrically to change state to indicate such movement of said indicator, first means including a register for registering the position of said indicator and providing an electrical pulse output representing a binary-coded pulse group series corresponding to the position of said indicator, and second means for operatively connecting said first means to said electro-optical means, said second means being effective, when said indicator moves in one direction along its path of movement, to operate said register to add increments of such movement and, when said indicator moves in the opposite direction along its path, to operate said register to subtract like increments of movement, said indicator being movable through a circular path, said devices being equally peripherally spaced in a plurality of pairs about the path, each pair having a clockwise device and a counterclockwise device, said light source including a light associated with each of said pairs of devices and arranged to direct light toward said path, said indicator being proportioned and designed, when it is approximately centered relative to the devices of each of said pairs, simultaneously to reflect the light back toward said devices, said register comprising an encoder and shaft means drivingly connected to said encoder, and said second means comprising first means for driving said shaft means in one direction about its axis to add increments of movement and second means for driving said shaft means in the opposite direction to subtract increments of movement.

7. An altitude-reporting apparatus of the character described comprising altitude sensing means including a peripherally narrow, radially extending movable indicator, means for tracking the position of said indicator, said tracking means including electro-optical means for detecting movement of said indicator, said electro-optical means including a plurality of light-responsive devices spaced along the path of movement of said indicator, a light source associated with said devices, each of said devices being effective, when said indicator moves past said device and produces a change in the amount of light impinging thereon, electrically to change state to indicate such movement of said indicator, first means including a register for registering the position of said indicator and providing an electrical pulse output representing a binary-coded pulse group series corresponding to the position of said indicator, and second means for operatively connecting said first means to said electro-optical means, said second means being effective, when said indicator moves in one direction along its path of movement, to operate said register to add increments of such movement and, when said indicator moves in the opposite direction along its path, to operate said register to subtract like increments of movement, said indicator being movable through a circular path, said devices being peripherally equally spaced in a plurality of pairs about said path, each pair having a clockwise device and a counterclockwise device, said light source being arranged to direct light on said devices, said indicator being arranged to move between each of said devices and said light source, said indicator being proportioned and designed, when it is approximately centered relative to the devices of each of said pairs, simultaneously to block the light directed at said devices, said register comprising an encoder and shaft means drivingly connected to said encoder, and said second means comprising first means for driving said shaft means in one direction about its axis to add increments of movement and second means for driving said shaft means in the opposite direction to subtract increments of movement.

8. The apparatus of claim 6 in which said second means includes a first two-state switch means operatively connected to each of said clockwise devices, rotary switch means drivingly connected to said shaft means, said rotary switch means comprising a rotor arranged for rotation with said shaft means and providing a peripherally extending contact strip formed with a gap at one peripheral portion thereof, a common contact member engaging and remaining continuously in contact with said strip, and a stator contact member operatively connected to each of said first two-state switch means and arranged to engage said contact strip, said stator contact members being equally peripherally spaced about said contact strip so that one of said stator contact members overlies said gap to provide an open circuit condition between the first two-state switch means connected thereto and said common contact member, each of said first two-state switch means being arranged, when said indicator moves past its associated clockwise device, to couple the stator contact member connected thereto to a power source for said first and second driving means, a second two-state switch means arranged alternatively to couple said first and second driving means to said common contact member, said second two-state switch means being arranged so that, when it is in its first state, said second driving means is coupled to said common contact member and, when it is in its second state, said first driving means is coupled to said common contact member, a third two-state switch means connected between each of said counterclockwise devices and said second two-state switch means, each third two-state switch means being arranged, when said indicator moves past the counterclockwise device connected thereto, to switch said second two-state switch means to its second state.

9. The apparatus of claim 7 in which said second means includes a first two-state switch means operatively connected to each of said clockwise devices, rotary switch means drivingly connected to said shaft means, said rotary switch means comprising a rotor arranged for rotation with said shaft means and providing a peripherallly extending contact strip formed with a gap at one peripheral portion thereof, a common contact member engaging and remaining continuously in contact with said strip, and a stator contact member operatively connected to each of said first two-state switch means and arranged to engage said contact strip, said stator contact members being equally peripherally spaced about said contact strip so that one of said stator contact members overlies said gap to provide an open circuit condition between the first two-state switch means connected thereto and said common contact member, each of said first two-state switch means being arranged, when said indicator moves past its associated clockwise device, to couple the stator contact member connected thereto to a power source for said first and second driving means, a second two-state switch means arranged alternatively to couple said first and second driving means to said common contact member, said second two-state switch means being arranged so that, when it is in its first state, said first driving means is coupled to said common contact member and, when it is in its second state, said second driving means is coupled to said common contact member, a third two-state switch means connected between each of said counterclockwise devices and said second two-state switch means, each third two-state switch means being arranged, when said indicator moves past the counterclockwise device connected thereto, to switch said second two-state switch means to its second state.

10. The apparatus of claim 8 in which each of said first and second driving means is a solenoid-type motor arranged, each time it is energized, to advance said shaft means one increment about its axis, the amount of each such increment being equal to the peripheral spacing between said stator contact members.

11. The apparatus of claim 9 in which each of said first and second driving means is a solenoid-type motor arranged, each time it is energized, to advance said shaft means one increment about its axis, the amount of each such increment being equal to the peripheral spacing between said stator contact members.

12. The apparatus of claim 6 in which said first driving means is connected to and operated by said clockwise devices and said second driving means is connected to and operated by said counterclockwise devices.

13. The apparatus of claim 7 in which said first driving means is connected to and operated by said clockwise devices and said second driving means is connected to and operated by said counterclockwise devices.

* * * * *